C. F. Hall.

Refitting Valves.

No. 3,654. Reissued Sept. 28, 1869.

Witnesses.
Theo Tuschke
J Alson Spam

Inventor.
C. F. Hall
Per Munn & Co
Attorneys

N. PETERS, PHOTO-LITHOGRAPHER, WASHINGTON, D. C.

United States Patent Office.

CHARLES F. HALL, FOR HIMSELF, AND CHARLES S. HALL, ASSIGNEE OF CHARLES F. HALL, OF BROOKLYN, NEW YORK.

*Letters Patent No.* 72,031, *dated December* 10, 1867; *reissue No.* 3,654, *dated September* 28, 1869.

IMPROVED MACHINE FOR REFITTING VALVES.

The Schedule referred to in these Letters Patent and making part of the same.

*To all whom it may concern:*

Be it known that CHARLES F. HALL, of Brooklyn, in the county of Kings, and State of New York, has invented a new and useful Improvement in Machine for Refitting Conical Valves; and that we, CHARLES F. HALL and CHARLES S. HALL, assignees of said CHARLES F. HALL aforesaid, do hereby declare that the following is a full, clear, and exact description thereof, which will enable others skilled in the art to make and use the same, reference being had to the accompanying drawings, forming part of this specification.

This invention relates to a device by which the conical stop-valves of gas, steam, and water-works may be refitted or repaired, when, from any cause, they are rendered leaky and unfit for use; and The invention consists in an improved construction of milling-tools, of such form that valves may thereby be rendered true and fit for service, as will be herein more fully described.

Similar letters of reference indicate corresponding parts.

Figure 1:
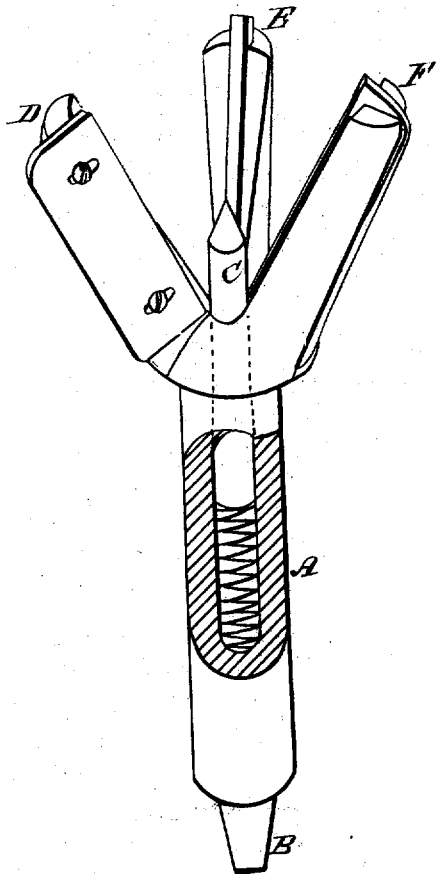
Figure 1 represents a longitudinal view of the tool, partly in section.
Figure 2:
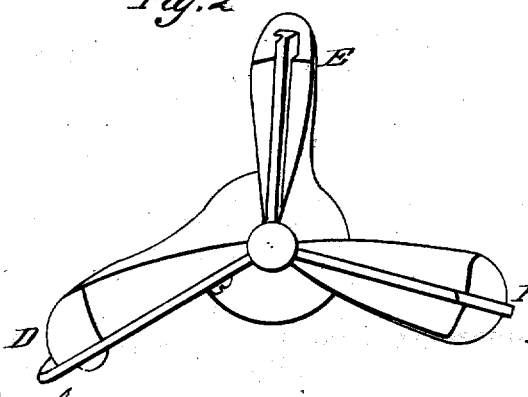
Figure 2 is a top or end view of the same.

As the tools for the purpose intended have hitherto been made, the cutting-edges have been formed on the interior surface of a hollow cone, the surface of the interior or disk of the cone being serrated, and forming cutting-edges, which radiate from near a common centre, and at an angle to a central line, which shall correspond with the bevel or angle of ordinary stop or conical valves and seats, so that valves of all the common sizes, from a small to a large diameter, may be operated upon by the same tool.

When made in this way, it is necessary to make the said hollow cones of steel, in order that suitable material may be had for the cutters, which is too expensive, and the tools so made are, owing to their shape, and the angular grooves made in forming the cutters, liable to break or crack in hardening and tempering; by reason of the unequal expansion and contraction, it is also difficult to sharpen the cutters when dull.

In order to be able to use a less expensive metal for the stock, and also to economize in the amount of metal employed for the said stock, and to sharpen the cutters when worn, more readily than can be done when made in this way, the present invention is intended to provide one or more cutters formed separately from the stock or conical mill, and applied thereto so as to project inwardly from the interior face of the stock more or less, as may be required for turning or scraping off the faces of the valves, which are to be pressed in against the said interior face of the stock in the usual way.

The said stock may consist of two or more arms or longitudinal sections of a cone, and each arm may be provided with a cutter, or only one arm may have a cutter, the others acting to hold the valve against the cutter, the said arms being smooth on the inner faces; or the stock may be a hollow cone, the same as now used, with the exception of the cutters, with one or more separate and movable cutters projecting through the shell thereof, the spaces between the cutters being smooth.

The said cutters may be attached to the stock in any convenient and suitable manner, for ready removal for grinding or adjustment or movement to or from the valves to be turned or refitted, which are pressed up against the smooth interior surface of the stock in the same way as in the machines now in use, and either the said stock supporting the cutters, or the adjustable tail-spindle used therewith, may be arranged so as to rotate, and thus cause the cutters to move over the surface of the valves to be operated on, or the valves themselves may be rotated between the cutters.

In this example of the invention, three methods of attaching the cutters are represented, corresponding in number with the arms on the shaft.

A represents the shaft.

B is the square shank by which the tool is revolved.

C represents the centre, which is placed in the shaft on a spiral spring, so that it will yield and adjust itself to the work it has to do; as, for instance, to valves of the different sizes or diameters which it may be necessary to operate upon.

D, E, and F represent the arms to which the movable and adjustable cutters are attached.

In D, the cutter with elongated holes is secured by screws;

In E, the cutter is dovetailed into the arm; and

In F, it is secured in a slot in the arm, as seen in the drawing.

These arms, with the shank to which they are connected, may be cast in one piece, of iron, the cutters being of steel; and, if a hollow cone be preferred, it, with its shank, may be cast in a similar manner.

This invention is not confined to any particular number of arms or cutters, nor to a stock separated into arms, or any particular method of securing or attaching the cutters to the stock, nor to any particular-shaped cutter or cutting-edge, for it is known that the desired effect may be produced on a conical valve, should the cutter or cutters stand in an inclined or in a spiral position, or an oblique longitudinal section of a cone with curved cutting-edge or edges; but having thus described the invention,

What is claimed, and desired to be secured by Letters Patent, is—

1. A tool, whether composed of two or more arms or longitudinal sections of a hollow cone, or a hollow cone and a stock A, provided with one or more cutters, adjustable or movable toward or from the valve to be operated on, and otherwise adapted for refitting the faces of conical valves, substantially as specified.

2. In combination therewith, the yielding centre C, substantially as described.

The above specification signed by us, this 30th day of June, 1869.

C. F. HALL.
C. S. HALL.

Witnesses:
FRANK BLOCKLEY,
ALEX. F. ROBERTS.